Patented Nov. 19, 1929

1,736,084

UNITED STATES PATENT OFFICE

GEORG KRÄNZLEIN AND ROBERT SEDLMAYR, OF HOCHST-ON-THE-MAIN, GERMANY, ASSIGNORS TO GENERAL ANILINE WORKS, INC., OF NEW YORK, N. Y., A CORPORATION OF DELAWARE

CONDENSATION PRODUCT OF THE ANTHRAQUINONE SERIES AND PROCESS OF MAKING SAME

No Drawing. Application filed November 23, 1925, Serial No. 70,986, and in Germany December 27, 1924.

The present invention relates to new condensation products of the anthraquinone series and process of making the same.

We have found that by causing an organic acyl halide to act upon dibenzanthronyl or upon the already cyclically closed dibenzanthrone in presence of an acid reacting condensing agent particularly aluminium chloride, new condensation products are obtainable which constitute valuable dyestuffs and give dyeings of various shades.

The following examples serve to illustrate our invention, the parts being by weight:

1. One part of dibenzanthronyl is finely ground with 10 parts of aluminium chloride and heated for a prolonged time at 120–150° C. with 6 parts of benzoylchloride in an atmosphere of oxygen. The molten mass is decomposed in the usual manner by means of hydrochloric acid and then forms a bluish-violet powder which dissolves in solvents of high boiling point to a blue solution and forms blue crystals. The color of its solution in concentrated sulfuric acid is similar to that of the dibenzanthrone, but when the solution of the new product in sulfuric acid is poured into water it coagulates to blue flakes, whereas the dibenzanthrone gives a violet precipitate. The dyestuff so obtained probably is represented by the following formula:

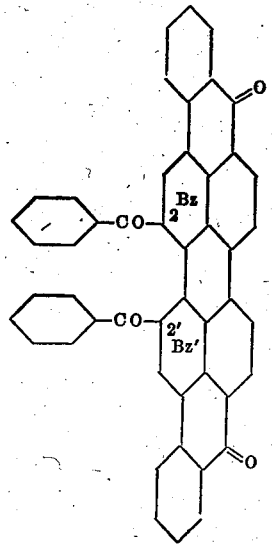

The vat prepared from the new product has a pure bluish-violet color without any fluorescence. This vat dyes cotton in the cold a pure blue tint like that of its bloom. Similar dyestuffs are obtained when the above indicated operations are carried out in presence of a solvent, for instance trichlorbenzene.

2. One part of dibenzanthronyl is heated and worked up in the manner indicated in Example 1 with 10 parts of sodium-aluminium chloride and oxalyl chloride in excess serving simultaneously as a solvent. Thus a greyish-green powder is obtained dissolving in sulfuric acid to a reddish-violet solution. On pouring the solution into water, green flakes separate therefrom. The vat prepared therefrom has a bluish-violet color with a bluish-green bloom and dyes greyish-blue tints. The dyestuff thus obtainable corresponds most probably to the following formula:

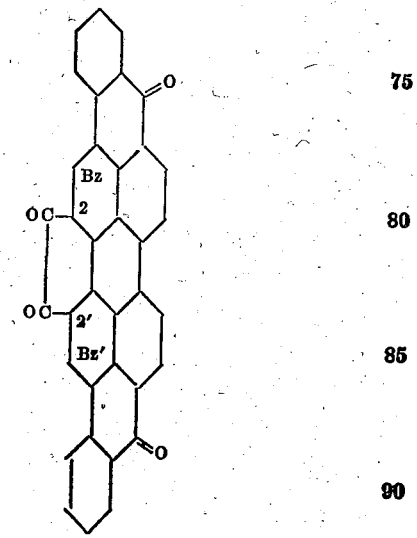

If for the dibenzanthronyl is substituted dibenzanthrone, similar dyestuffs are obtainable. In an analogous manner may be used instead of the above named acid halides other acid halides, for instance phosgene, in which case grey to black dyestuffs are obtained. Furthermore there may be used acetyl chloride.

If in the above described process the employed oxygen atmosphere is replaced by a halogen, there are obtained more or less highly halogenated products, some of which are more difficultly reduced to their leuco-compounds and give on cotton bluish-green to greenish-blue tints.

The reaction proceeds in such a manner that when using dibenzanthronyl there is at first formed dibenzanthrone. Therefore it makes no difference for the reaction whether there is used as starting product dibenzanthrone or dibenzanthronyl.

We claim:

1. Process of preparing condensation products of the anthraquinone series which consists in condensing at an elevated temperature a dibenzanthrone not substituted in the Bz2, Bz2' position with an organic acyl halide in presence of an acid reacting condensing agent.

2. Process of preparing condensation products of the anthraquinone series which consists in condensing at an elevated temperature a dibenzanthrone not substituted in the Bz2, Bz2' position with a benzoylhalide in presence of an acid reacting condensing agent.

3. Process of preparing condensation products of the anthraquinone series which consists in condensing at an elevated temperature a dibenzanthrone not substituted in the Bz2, Bz2' position with an organic acylhalide in the presence of aluminium chloride.

4. As new products, the vat dyestuffs substantially identical with the condensation products obtainable by condensing a dibenzanthrone not substituted in the Bz2, Bz2' position with an organic acylhalide in the presence of an acid reacting condensing agent.

5. Process of preparing condensation products of the anthraquinone series which consists in heating at a temperature of about 120–150° C. a dibenzanthrone with an organic acylhalide in the presence of aluminium chloride and in an atmosphere of oxygen.

6. Process of preparing condensation products of the anthraquinone series which consists in heating one part of dibenzanthrone with six parts of benzoylchloride at a temperature of about 120–150° C. in the presence of ten parts of aluminium chloride and in an atmosphere of oxygen.

7. As a new product the compound of the general formula:

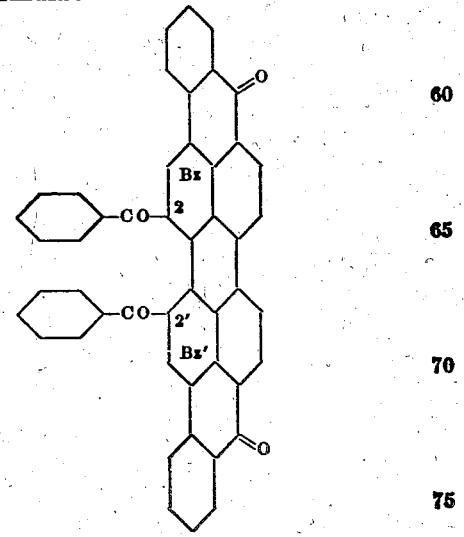

which dyes cotton from bluish-violet vat pure blue shades.

In testimony whereof, we affix our signatures.

GEORG KRÄNZLEIN.
ROBERT SEDLMAYR.